(12) United States Patent
Palagummi et al.

(10) Patent No.: US 11,507,611 B2
(45) Date of Patent: Nov. 22, 2022

(54) PERSONALIZING UNSTRUCTURED DATA ACCORDING TO USER PERMISSIONS

(71) Applicant: Dell Products L.P., Round Rock, TX (US)

(72) Inventors: Kalyan Palagummi, Dublin, CA (US); Hung Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/084,846

(22) Filed: Oct. 30, 2020

(65) Prior Publication Data

US 2022/0138243 A1    May 5, 2022

(51) Int. Cl.
    *G06F 16/335*    (2019.01)
    *G06F 16/953*    (2019.01)
    *G06F 16/35*     (2019.01)
    *G06F 9/54*      (2006.01)
    *H04L 9/06*      (2006.01)

(52) U.S. Cl.
    CPC .............. *G06F 16/35* (2019.01); *G06F 9/541* (2013.01); *G06F 16/335* (2019.01); *G06F 16/953* (2019.01); *H04L 9/0643* (2013.01)

(58) Field of Classification Search
    CPC ....... G06F 16/35; G06F 16/953; G06F 16/335
    See application file for complete search history.

(56) References Cited

U.S. PATENT DOCUMENTS

| | | | | |
|---|---|---|---|---|
| 8,176,283 | B1* | 5/2012 | Hanson | G06F 12/14 711/163 |
| 8,484,208 | B1* | 7/2013 | Raghavan | G06F 16/248 707/728 |
| 2006/0136390 | A1* | 6/2006 | Zhao | G06F 16/9014 707/999.003 |
| 2015/0370824 | A1* | 12/2015 | Chui | G06F 16/21 707/786 |
| 2017/0206226 | A1* | 7/2017 | Eleish | G06F 3/0673 |

\* cited by examiner

*Primary Examiner* — Kannan Shanmugasundaram
(74) *Attorney, Agent, or Firm* — Daly, Crowley, Mofford & Durkee, LLP

(57) ABSTRACT

A system and method provide unstructured data to a client device based on permissions possessed by the device user and required by the data for access. Items of unstructured data stored in a data storage device are organized into data segments based on classifications assigned to them by their creators using a content management system. When a user later requests access to the data via a cloud-based service, such as a search service, the user privileges are converted into data segment identifiers which are then searched, and only the items of unstructured data that correspond to matching identifiers are returned. Data segment identifiers may be provided illustratively as a hash function to facilitate searching and to guarantee non-collision of data segment identifiers.

20 Claims, 4 Drawing Sheets

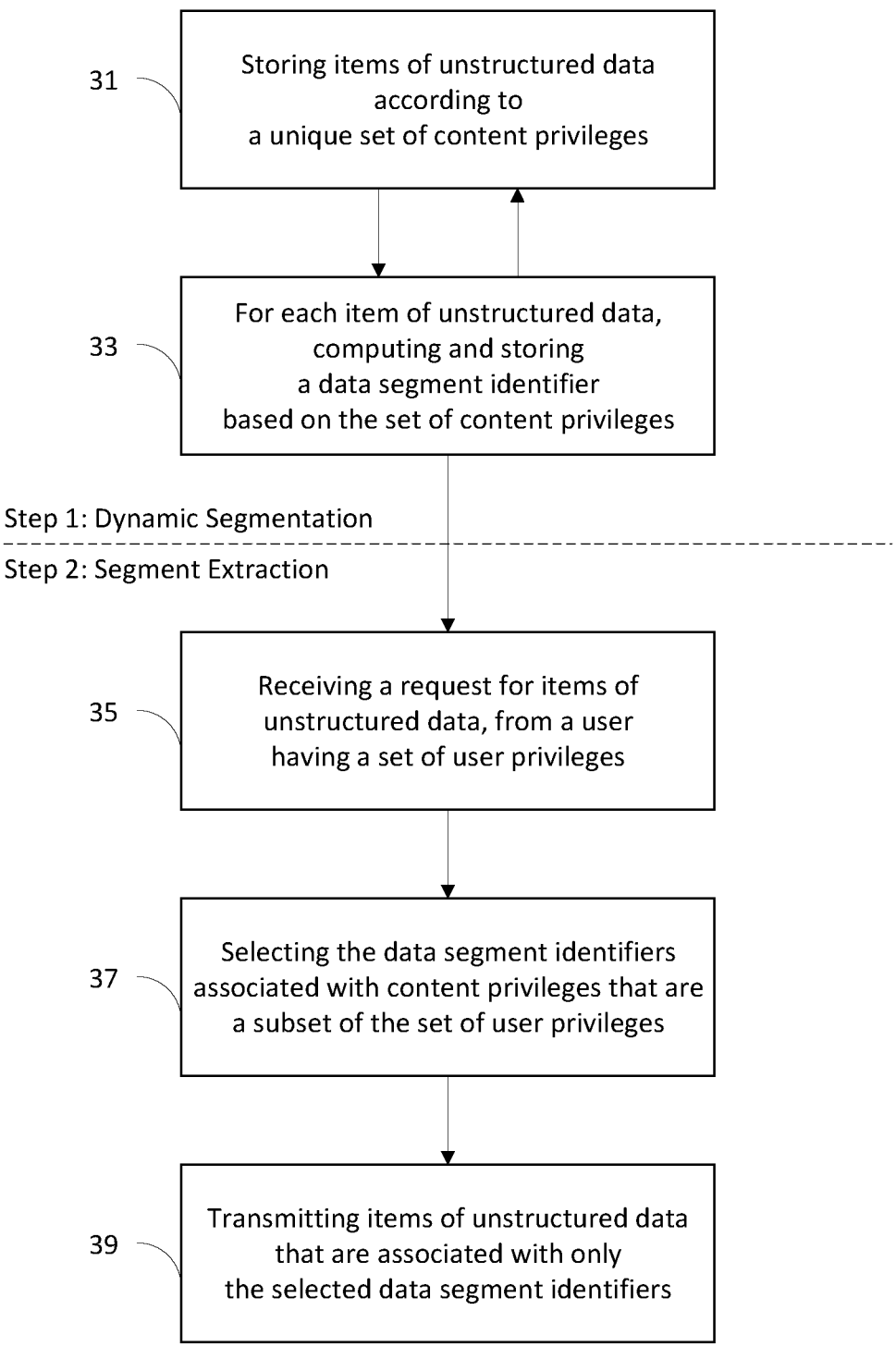

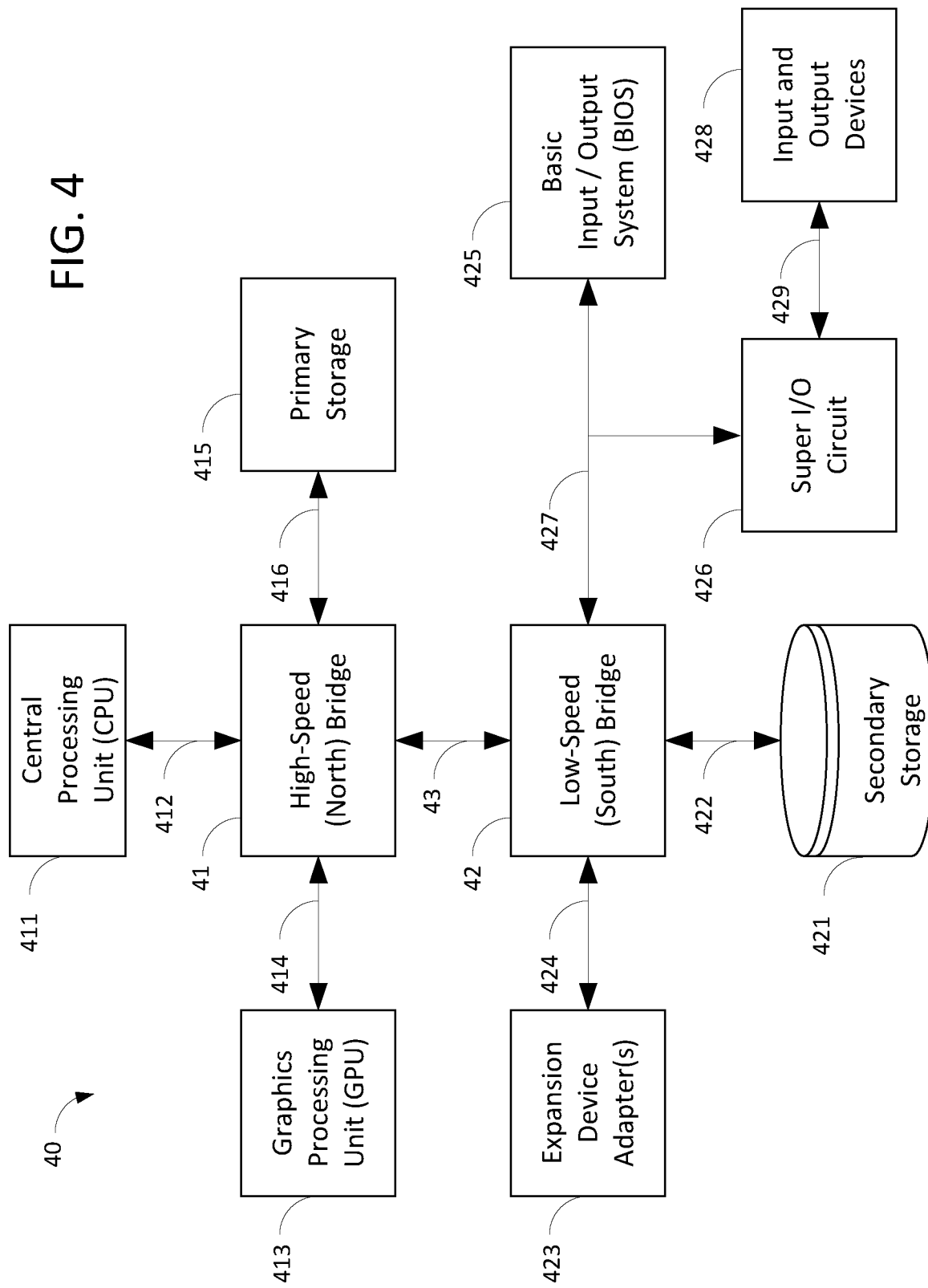

PERSONALIZING UNSTRUCTURED DATA ACCORDING TO USER PERMISSIONS

FIELD

The disclosure pertains generally to retrieval of unstructured data from a database, and more particularly to filtering the unstructured data stored in the database on the basis of user permissions.

BACKGROUND

Many modern web and cloud-based applications are heavily content driven, and include unstructured data, such as video, audio, animation, or textual data. Large systems may have hundreds of thousands or even millions of unstructured data files, consuming hundreds of terabytes of storage or more, and some estimates place the amount of unstructured data at 95% of all data generated, with only 5% structured data. When unstructured data are stored in typical relational database management systems ("RDBMS"), requests to retrieve the data often suffer performance penalties because, unlike data records having a fixed size, records with these large objects have irregular sizes and therefore require more time to process. This problem is multiplied in systems that provide internationalization ("i18n") and localization ("L10n"), i.e. systems that encode unstructured data whose underlying content exists in multiple languages, as the size of these data grows roughly proportionally to the number of languages supported.

The problem of locating unstructured data in a database is made more complex when user permissions are introduced. Each individual user of the cloud-based application may be authorized to access only a subset of the unstructured data stored in the database, so the data retrieval system must match user roles or permissions against corresponding content permissions. However, if permissions are defined independently of each other, then a system with n different permissions has $2^n$ different combinations of those permissions, so the problem of matching user permissions to content permissions grows exponentially with the number of roles. Thus, for a relatively small system with only 20 different roles, there are over one million different possible permission sets, which must be compared against each of thousands or potentially even more database records. Such comparisons can take dozens of seconds, even on tailor-built hardware. Moreover, as requests for access to the unstructured data can occur at any time, the comparison of permissions must be done at the moment the request is made, so such long delays result in a poor end user experience.

There are solutions in the market to address user personalization for the unstructured data at a small scale. These products involve database or metadata or taxonomy-based entitlement driven models, with licensed, proprietary systems. However, these products fail to solve the problem in an adaptive, integrated, and highly scalable way when the business rules (e.g. defined user roles) become more complex and content multiplies due to i18N and L10n issues. These products do not operate at scale, and the end user experience suffers as a result.

SUMMARY OF DISCLOSED EMBODIMENTS

Disclosed embodiments provide an enterprise, scalable, high performance, adaptive and unique solution to the above problem, that algorithmically performs auto-segmentation and auto-tagging of unstructured data assets, while providing extremely fast classification and segment processing at user request time. Embodiments offer a novel framework that provides a seamless experience to all users. In addition to improving the application experience for each user, embodiments scale to millions of concurrent searches without compromising on performance or stability.

The disclosed approach solves the problem of user personalization by breaking its computational aspects into two parts that can be performed at different times. The first part of the solution is dynamic content segmentation, in which items of unstructured data are tagged with various content permissions by their creators upon inclusion into the database, and optionally by content curators at a later time. Embodiments detect when such tagging occurs, and merge all of the permissions into a unique data segment identifier, so that all items of unstructured data that have the same content permissions fall into (and thus define) the same data segment. The second part of the solution is classification and segment extraction, which is performed in response to a user request. At this time, the user's permissions are obtained (e.g. from a permissions table or from the request itself) and compared against permissions only for those data segments that have been already created by the content provider. The number of actual segments will be small relative to the number of possible data segments that grows exponentially with the number of roles, so the request-time computation is greatly reduced. This is due to the observation that, in practice, user roles (and the associated permissions) often are clustered together, rather than distributed evenly across all possible combinations of roles.

Thus, a first embodiment is a system for providing unstructured data to a client device. The system includes a data storage device configured to store items of unstructured data according to a set of content privileges. Each item of unstructured data is associated with a stored data segment identifier based on the set of content privileges. The system also includes a server device, coupled to the data storage device, configured to execute a service for receiving a request for items of unstructured data from a user of the client device having a set of user privileges. And the system includes a processor, coupled to the server device and the data storage device. The processor is configured to select the stored data segment identifiers that are based on a set of content privileges that is a subset of the set of user privileges. Finally, the service is configured to respond to the received request by transmitting, toward the client device, items of unstructured data that are associated with only the selected data segment identifiers.

In some embodiments, the unstructured data comprise binary executable data, or video data, or audio data, or image data, or textual data, or any combination thereof.

In some embodiments, at least one data segment identifier comprises a hash function of the set of content privileges.

In some embodiments, the service comprises a website, or a search engine, or a content-matching application programming interface.

In some embodiments, the service is further configured to respond to the received request by transmitting the items of unstructured data toward the client device together with structured data.

Some embodiments further include a content management system, coupled to the data storage device, configured for altering a set of content privileges for each item of unstructured data stored in the data storage device.

In some embodiments, the processor is further configured to detect the content management system altering the set of content privileges for an item of unstructured data stored in the data storage device. When this occurs, the processor is configured to responsively generate a universally unique data segment identifier that is associated with the altered set of content privileges for the item of unstructured data. The processor is also configured to store, in the data storage device, an association between the item of unstructured data and the generated universally unique data segment identifier.

Another embodiment is a method of providing unstructured data to a client device. The method includes storing items of unstructured data in a data storage device according to a set of content privileges. The method next includes, for each item of unstructured data, computing and storing in the data storage device a data segment identifier based on the set of content privileges. The method next includes receiving a request for items of unstructured data, by a server device from a user of the client device having a set of user privileges. The method proceeds by selecting the stored data segment identifiers that are based on a set of content privileges that is a subset of the set of user privileges. The method then includes the server device responding to the received request by transmitting, toward the client device, items of unstructured data that are associated with only the selected data segment identifiers.

In some embodiments, the unstructured data comprise binary executable data, or video data, or audio data, or image data, or textual data, or any combination thereof.

In some embodiments, at least one data segment identifier comprises a hash function of the set of content privileges.

In some embodiments, receiving the request from the user comprises receiving the request pertaining to a website, or a search engine, or a content-matching application programming interface, provided by the server device.

In some embodiments, the responding to the received request includes transmitting the items of unstructured data toward the client device together with structured data.

Some embodiments further include altering a set of content privileges for an item of unstructured data stored in the data storage device.

Some embodiments also include, by the processor responsively to the altering of the set of content privileges for the item of unstructured data, generating a universally unique data segment identifier that is associated with the altered set of content privileges for the item of unstructured data; and storing, in the data storage device, an association between the item of unstructured data and the generated universally unique data segment identifier.

Yet another embodiment is a computer-readable storage medium that non-transitorily stores computer program code for performing the above method, or any of it variants.

It is appreciated that the concepts, techniques, and structures disclosed herein may be embodied in other ways, and thus that the above list of summarized embodiments is illustrative only, and not limiting.

DESCRIPTION OF THE SEVERAL VIEWS OF THE DRAWINGS

The manner and process of making and using the disclosed embodiments may be appreciated by reference to the drawings, in which:

FIG. 3 is a flowchart of a method of providing unstructured data to a client device according to an embodiment; and FIG. 4 schematically shows relevant physical components of a computer that may be used to embody, in whole or in part, the concepts, structures, and techniques disclosed herein.

DETAILED DESCRIPTION OF EMBODIMENTS

In this specification, including the appended claims, the following quoted terms shall have the indicated meanings that are not limited to specific embodiments, except where expressly indicated otherwise:

"Structured data" means data having a data model that does not permit arbitrarily-sized content. Structured data include, without limitation, database records having fixed-sized fields.

"Unstructured data" means data that are not structured, either because they lack a known data model or because their model permits arbitrarily-sized content. Unstructured data of the latter type include, without limitation, files or file fragments containing binary executable data, video data, audio data, image data, and textual data. Fragments may be stored using data formats known in the art such as JavaScript Object Notation (JSON) or Extensible Markup Language (XML).

Figure 1:
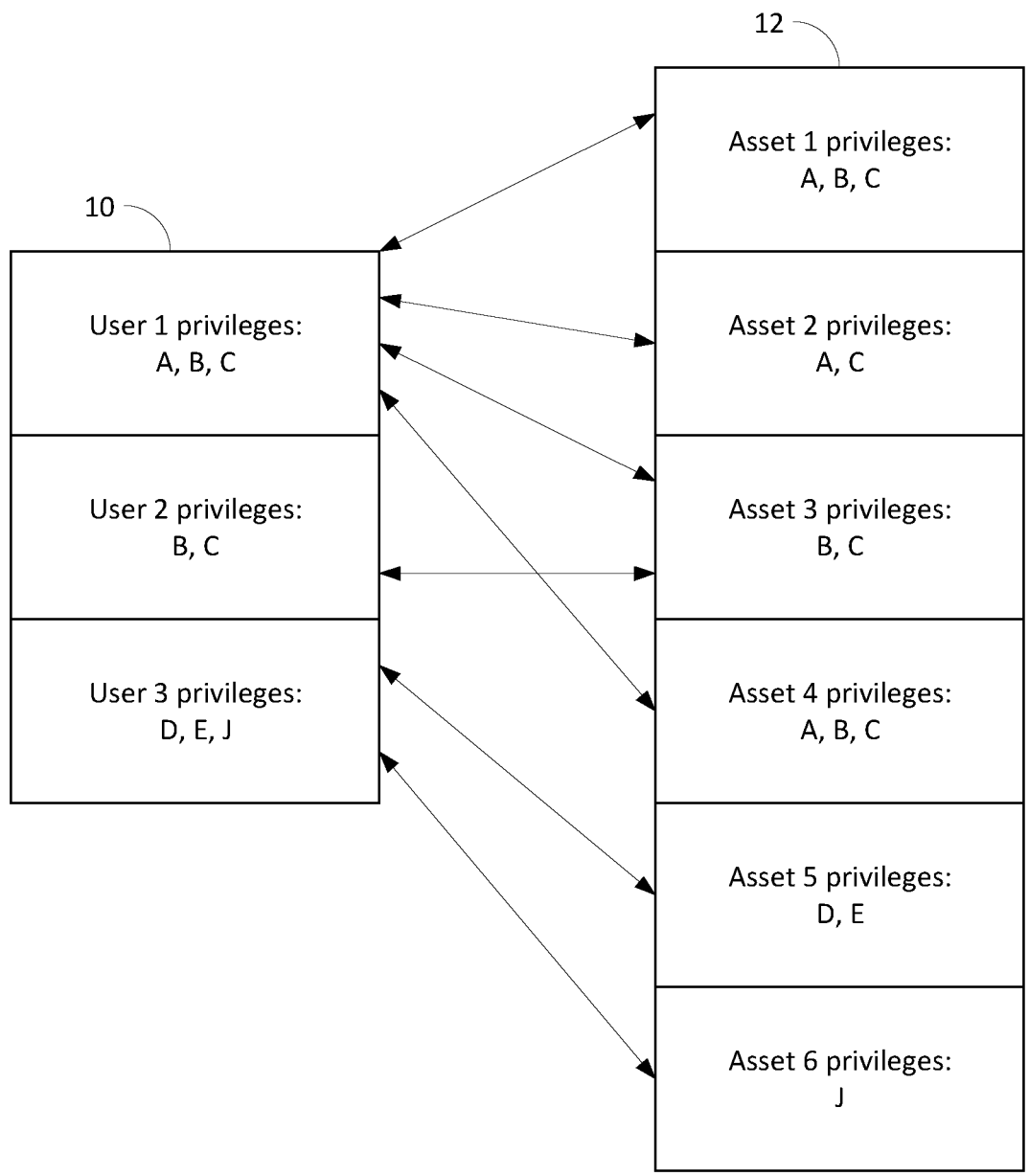
FIG. 1 illustrates relationships between hypothetical users and unstructured data assets in accordance with embodiments.

To provide some context for the problem that is solved by embodiments disclosed herein, FIG. 1 illustrates relationships between three hypothetical users 10 and six unstructured data assets 12. User 1 has privileges A, B, and C; user 2 has privileges B and C; and user 3 has privileges D, E, and J. Likewise, Asset 1 has privileges A, B, and C; asset 2 has privileges A and C; asset 3 has privileges B and C; asset 4 has privileges A, B, and C (i.e. the same privileges as asset 1); asset 5 has privileges D and E; and asset 6 has privilege F.

The labeling of these privileges is purely arbitrary; each privilege may correspond to a particular role played by, or characteristic of, one of the users 12. These roles and characteristics may be, for example, "power user" or "vice president of marketing" or "external vendor", or even "speaks English" or "lives in Germany", and so on. Embodiments may define any number of such privileges. The computational complexity of matching users to digital assets, including unstructured data 12, grows exponentially with the number of different privileges.

In accordance with the problem being solved, a user matches (has access to) a particular item of unstructured data if, and only if, the set of user privileges contains the set of content privileges for that item; or, in other words, if the content privileges are a subset of the user privileges. In more detail, if an item of unstructured data requires an access privilege that is not possessed by a requesting user, then clearly the user cannot be allowed to access the item. Conversely, if the user has privileges beyond what are required by the item, then this fact should not prevent the user from accessing the item.

By way of illustration in FIG. 1, user 1 has privileges A, B, and C, and thus may access all assets whose privileges are selected from this set; that is, assets whose privilege set is A, or B, or C, or A+B, or A+C, or B+C, or A+B+C. It is appreciated that there are seven options for three privileges, and $7=2^3-1$. As indicated in the Figure, assets 1, 2, 3, and 4 all have content privilege sets that are one of these seven options. However, assets 5 and 6 have privilege sets that are not one of these seven options, and thus are inaccessible to user 1.

User 2 has privileges B and C, and thus may access all assets whose privilege set is B, or C, or B+C, but nothing else. It is appreciated that there are three options for two privileges, and $3=2^2-1$. As may be seen from FIG. 1, only asset 3 has a privilege set that is one of these three options. Consequently, user 2 may access only asset 3.

Finally, user 3 has privileges D, E, and J, and therefore may access assets whose privilege set is D, or E, or J, or D+E, or D+J, or E+J, or D+E+J. It is appreciated that there are again seven options for three privileges, and $7=2^3-1$. Looking through the assets, only asset 5 and asset 6 have a privilege set that is one of these seven options.

The matching problem illustrated in FIG. 1 is a very small one. In a practical system, the number of privileges available to users may number in the dozens or more. Observing that $2^{10}=1024$, the number of possible privilege sets is multiplied by over one thousand for each ten additional privileges. Moreover, the number of digital assets (including unstructured data assets) may be arbitrary. Thus, the numbers of users, assets, and privileges shown in FIG. 1 is purely illustrative to assist with understanding the problem being solved, and should not be viewed as limiting the scope of embodiments according to the concepts, techniques, and structures disclosed herein.

Figure 2:
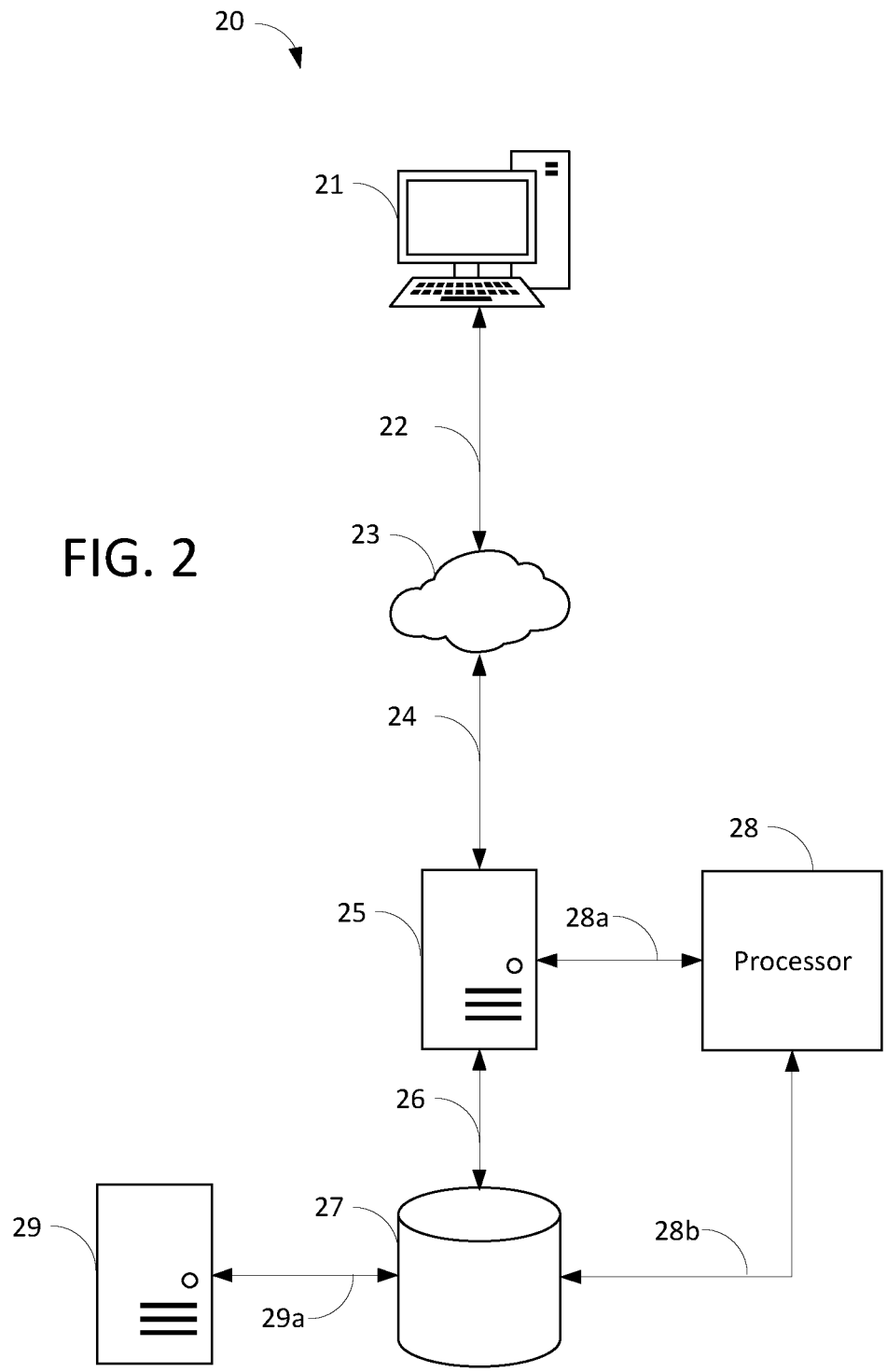
FIG. 2 schematically shows a client-server system in which the disclosed concepts, structures, and techniques may be advantageously embodied.

FIG. 2 schematically shows a client-server system 20 in which the disclosed concepts, structures, and techniques may be advantageously embodied. In accordance with client-server principles, the system 20 includes at least one client device coupled for bidirectional data communication with at least one server device using a data network. Generally, the client requests, via the data network, that the server perform a computation or other function, and the server responsively fulfills the request, optionally returning a result or status indicator to the client via the data network.

Thus, the system 20 includes a client device 21. The client device 21 is illustrated as a desktop computer, but may be any electronic device known in the art, including without limitation a laptop computer, tablet computer, smartphone, embedded system, or any other device capable of transmitting and receiving data, and requesting that another electronic device perform a computation.

The client device 21 is coupled, via a data link 22, to a data network 23. The data link 22 is any combination of hardware or software suited for communicating data between the client device 21 and other electronic devices via the data network 23. The data link 22 may be, for example, a wired Ethernet link based on the Institute of Electrical and Electronics Engineers ("IEEE") 802.3 family of standards, a wireless radio link based on the IEEE 802.11 family of standards ("Wi-Fi"), or any other data connection.

The data network 23 is any combination of hardware or software suited for communicating data between electronic devices via data links. The data network 23 may be, for example, a local area network ("LAN"), a wide area network ("WAN"), a metropolitan area network ("MAN"), a virtual private network ("VPN"), the Internet, or any other type of data network.

It is appreciated that a data network 23 operates to mediate data communication between multiple electronic devices. Thus, the depiction of only a single client device 21 in FIG. 2 is merely illustrative, and a typical system 20 may have any number of client devices coupled for data communication using corresponding data links to the data network 23. It is also appreciated that the data network 23 may be operated by any number of autonomous entities, and thus may be a conglomeration of smaller networks that exchange data according to standardized protocols and data formats, including without limitation the Internet Protocol ("IP") specified by Internet Standard STD 5, the User Datagram Protocol ("UDP") specified by Internet Standard STD 6, and the Transmission Control Protocol ("TCP") specified by Internet Standard STD 7, among others.

The data network 23 allows the client device 21 to communicate with a server device 25, which is coupled to the data network 23 using a data link 24. The data link 24 is any combination of hardware or software suited for communicating data between the server device 25 and other electronic devices via the data network 23. The server device 25 may be any electronic device known in the art that is capable of transmitting and receiving data, and performing a computation on behalf of another electronic device.

Again, the data network 23 operates to mediate data communication between multiple electronic devices. Thus, the depiction of only a single server device 25 in FIG. 2 is merely illustrative, and a typical system 20 may have any number of server devices coupled for data communication using corresponding data links to the data network 23. In particular, to provide simultaneous service to large numbers of client devices, a particular computation (or type of computation, such as rendering a web page) may be allocated to one of multiple server devices using a load balancer or other device. It is further appreciated that the server device 25, along with additional server devices if required, may provide well-defined operations known as "services" according to a service-oriented architecture ("SOA"), as those terms are known in the art.

It is appreciated in accordance with client-server principles that the designation of device 21 as the "client device" and device 25 as the "server device" is arbitrary, as most electronic devices that are capable of transmitting and receiving data can perform computations on behalf of other electronic devices upon receipt of data, so requesting, according to a mutually agreed protocol. Thus, the designation of "client device" and "server device" is made herein with regard to an intended mode of operation of the system 20, namely that the client device 21 is the device requesting that a particular computation be performed on behalf of a user thereof, and that the server device 25 operates a "service" to perform the computation and communicate the results to the client device 21. A typical protocol for such interaction is the Hypertext Transfer Protocol ("HTTP" or "HTTP/1.1") specified as a proposed Internet Standard by Requests for Comment ("RFC") 7230 through 7235, which is used to implement the World Wide Web.

FIG. 2 shows the server device 25 coupled, via a storage link 26, to a data storage device 27. The data storage device 27 may be a database, file system, volatile or non-volatile memory, network attached storage ("NAS"), storage area network ("SAN"), or any other hardware or software that is capable of storing data used by a server device 25 or a service executing thereon. The storage link 26 may be any hardware or software capable of communicating data between the server device 25 and the data storage device 27. It is appreciated that, where more than one server device 25 is present, multiple server devices may communicate with the same data storage device 27 to provide data sharing between the server devices. In accordance with disclosed embodiments, the data storage device 27 may store unstructured data, including binary executable data, or video data, or audio data, or image data, or textual data, or any combination thereof.

It is appreciated that a requested computation may be done in several parts, thereby requiring the system 20 to retain an intermediate computational state between requests. If the services provided by the server device 25 do not store any such state (for example, to simplify their design), then the client device 21 must supply all state with each request. This type of communication may be provided using the representational state transfer ("REST") client-server architecture. In addition to being a stateless client-server architecture, REST systems permit responses to requests with identical inputs to be cached to improve response time; permit layering of services, thereby multiplying available functionality; permit services to require clients to perform some computation locally to improve performance; and provide a uniform interface for all client devices.

As described below in more detail, each item of unstructured data stored in the data storage device 27 is associated with a universally unique data segment identifier in a plurality of such data segment identifiers. In this way, all of the stored items may be conceptualized as grouped into identified data segments. By performing such a logical grouping, disclosed embodiments may search for items of unstructured data by segment identifier, rather than by some item identifier as known in the art, thereby greatly increasing the search speed.

The organizing principle behind the data segments is that each data segment identifier is associated with a set of content privileges. Thus, items of unstructured data are effectively grouped by access privileges. It is appreciated that other grouping criteria might be used in embodiments, such as creation date, modification date, data type, and so on. However, for clarity of description and to solve the particular problem of matching users with unstructured data on the basis of access privileges, these access privileges are used as the organizing criteria. As described in more detail below in connection with FIG. 3, in some embodiments the data segment identifiers may be created as a hash function of the set of content privileges.

In accordance with illustrative embodiments, the data storage device 27 is configured to store items of unstructured data. To facilitate their retrieval, and in particular to provide content classification into segments and searching by those segments, the system 20 further includes a processor 28 that is coupled to the server device 25 via a first data link 28*a*, and to the data storage device 27 via a second data link 28*b*. The processor 28 may be any device for mediating retrieval of unstructured data, from the data storage device 27 on behalf of a service executing in the server device 25, in accordance with the concepts, techniques, and structures disclosed herein.

In some embodiments, the processor 28 uses different hardware than the server device 25, while in other embodiments the processor 28 uses the same hardware as the server device 25 and executes as an application thereon. Thus, the depiction of the processor 28 and the server device 25 as separate elements in FIG. 2 is made for conceptual purposes, and is not limiting. The data link 28*a* may be any hardware or software capable of communicating data between the processor 28 and the server device 25. The data link 28*b* may be any hardware or software capable of communicating data between the processor 28 and the data storage device 27. The particular choice of such hardware or software in either case depends on whether the processor 28 is provided as separate hardware from the server device 25; nevertheless, a person having ordinary skill in the art will be able to make this choice without undue experimentation.

Embodiments further include a content management system (CMS) 29, coupled to the data storage device 27 via a data link 29*a*. The CMS 29 may be any hardware or software system known in the art for managing data stored in the data storage device 27. In some embodiments, the CMS 29 uses different hardware than the server device 25, while in other embodiments the CMS 29 uses the same hardware as the server device 25 and executes as an application thereon. Thus, the depiction of the CMS 29 and the server device 25 as separate elements in FIG. 2 is made for conceptual purposes, and is not limiting. The data link 29*a* may be any hardware or software capable of communicating data between the CMS 29 and the data storage device 27.

In accordance with illustrative embodiments, the CMS 29 is configured for managing content stored in the data storage device 27, and in particular for altering a set of content privileges for each item of unstructured data stored in the data storage device 27. An author or content curator can associate an item of unstructured data with any number of content privileges, for example based on the business-defined roles of users who should have access to that item. Content privileges are stored in the CMS 29 as part of metadata associated with each item of unstructured data.

The server device 27 is configured to execute a service for receiving a request from a user of the client device. In some embodiments, the service provides a website, or a search engine, or more generally any content-matching application programming interface (API). In the case of a search engine, the search results are the unstructured data, and embodiments enable any search engine to effectively support permissions-based, personalized search results for unstructured data, in addition to the relevancy or ranking, without compromising search engine performance. The request identifies the user of the client device, and from this identity the processor 28 may obtain a set of privileges of the user. The data encoding this set of user privileges may be stored in any convenient location, such as the data storage device 27, or some other data storage device (not shown), or the CMS 29, or any other location accessible to the processor 28. Alternately, the request itself may include the user privilege data.

As discussed above, the problem of personalization is divided into two steps, of which the first step is dynamic segmentation of digital content, including unstructured data. In disclosed embodiments, the processor 28 is configured to perform this dynamic segmentation, i.e. to assign items of unstructured data to particular data segments, whether they are newly added to the CMS 29 or whenever their privileges are changed. Advantageously, dynamic segmentation of each item of unstructured data may be performed before receiving a user request for the item, thereby reducing the computational load on the system necessary to fulfill each request.

Thus, in some embodiments, the processor 28 is further configured to detect the CMS 29 altering the set of content privileges for an item of unstructured data stored in the data storage device 27. When the processor 28 detects such an alteration, it thereby recognizes that the item of unstructured data now belongs to a different data segment. In response, the processor 28 generates a data segment identifier that is associated with the altered set of content privileges for the item of unstructured data. The processor 28 then stores, in the data storage device 27, an association between the item of unstructured data and the generated data segment identifier. Particular techniques for creating a data segment identifier are described in detail below in connection with FIG. 3.

The processor 28 also performs the second step, namely segment extraction, when each request is received. Thus, the processor 28 is configured to select the data segment identifiers, from the plurality of data segment identifiers for items of unstructured data stored in the data storage device 27, that are associated with a set of content privileges that is a subset of the set of privileges of the user of the client device. Particular techniques for performing segment extraction are described in detail below in connection with FIG. 3.

The service executing on the server device 25 is configured to respond to the received request by then transmitting, toward the client device 21, some or all of the items of unstructured data that are associated with only the data segment identifiers selected by the processor 28. It is appreciated that issues of content caching, network bandwidth, or other technical matters may dictate transmitting fewer than all of the items of unstructured data, and that the decision of which items to transmit may be made algorithmically, and that a person having ordinary skill in the art would appreciate when the design of the system 20 requires such measures to be implemented and how to do so.

In some embodiments, the transmitted items of unstructured data may be accompanied by structured data, if performance of the service so requires. A person having ordinary skill in the art will appreciate the circumstances under which the combination of structured and unstructured data in a response fulfills a request made by the user of the client device.

In FIG. 3 is shown a flowchart of a method 30 of providing unstructured data to a client device according to an embodiment. The client device may be client device 21, and the method may be performed in concert by the server device 25 and the processor 28, using the data storage device 27. In some embodiments, the method may further use the CMS 29. The method 30 is divided, as mentioned above, into the two steps of dynamic segmentation of content, and segment extraction. For ease of visual recognition, these steps are divided by a dashed line in the Figure.

The method 30 begins with a process 31 of storing items of unstructured data in a data storage device, such as the data storage device 27. Each item of unstructured data is associated with a data segment identifier in a plurality of data segment identifiers, and each data segment identifier is associated with a set of content privileges. The unstructured data comprise binary executable data, or video data, or audio data, or image data, or textual data, or any combination thereof.

The process 31 may include content authors creating content or uploading digital assets. When they do, they associate or "tag" content in the data storage device 27 with privilege classifications, in order to restrict access to only authorized users. Any number of classifications may be used, provided they are chosen from classifications that appear in profile data of registered users. In various embodiments, user profile data may be stored in any convenient location including a content management system, such as CMS 19. When authors tag content metadata in the content management system, the classifications may be stored in any format, such as a comma separated list of text values, e.g. "C1" for classification 1 and so on.

The process 31 may include altering a set of content privileges for an item of unstructured data stored in the data storage device. The altering may be performed, in some embodiments, by a content curator some extended time after the storing, for example if it is determined that different users should be able to access the particular item.

The method 30 next includes a process 33, in which a universally unique data segment identifier is computed and stored for each item of unstructured data. This process 33 is performed illustratively by the processor 28. The data segment identifier is based on the set of content privileges for the corresponding item, and is universally unique in the sense that different physical embodiments (e.g. as appearing in different clouds or different data centers) will generate different data segment identifiers with all other conditions being equal. Each different classification pattern becomes a different data segment. Advantageously, process 33 may be performed without input from, or knowledge of, the content authors or curators. Thus, embodiments may be added to existing content management workflows without causing any disruption.

In accordance with illustrative embodiments, the process 33 performs the following algorithm. The set of classifications is formed into a text string, and the text string is used as input to a hash function having a uniform distribution. As known in the art, a hash function is a function that maps data of arbitrary size into values having a fixed size. The resulting hash values are the data segment identifiers, and are stored in a table, illustratively in the data storage device 27. Finally, an association is stored between the data segment identifier just computed and the corresponding item of unstructured data.

In this way, items of unstructured data that have the same classifications end up with the same data segment identifiers, so a query against the data segment identifier will return a collection of such items. Content is thus seamlessly reorganized in the form of data segments, each of which pertains to one or more, and perhaps very many, items of unstructured data.

The processes 31, 33 of step 1 may be performed repeatedly on many different items of unstructured data, independently of the execution of any service that provides the data to an end user. Eventually, however, these data must be provided to an end user, and in this connection the method 30 advances to the processes 35, 37, 39 of step 2.

Thus, the method 30 continues to process 35 of receiving a request for items of unstructured data, by a server device from a user of the client device having a set of user privileges. Illustratively, the client device may be the client device 21, and the server device may be the server device 25, while the request itself may pertain to a website or a search engine provided by the server device. The set of user privileges must align with the set of content classification privileges discussed above, and is typically contained in a user profile. That is, each user privilege must correspond to a classification that may appear as a tag on a particular item of content (and especially on items of unstructured data), so the two sets of data are comparable.

The method 30 then advances to the process 37 of selecting the data segment identifiers associated with content privileges that are a subset of the set of user privileges. In process 37, a programmatic loop is performed to compare the list of stored data segment identifiers (say, of size S) with a list of such possible identifiers that is derived from the user privileges. If there are p different privileges in the set of user privileges, then the number of possible derived data segment identifiers is $P=2^p-1$. It is appreciated that this loop should be as small as possible, and thus the process 37 compares the sizes of these two lists (i.e. S versus P) to determine which is smaller, and loops over the smaller list.

If S<P, then the process 37 loops over the stored data segment identifiers, looking up the associated content privileges and determining whether those privileges are a subset of the set of user privileges. This task may be performed, for example, by encoding each set of privileges in a bitmap (with each bit being 1 if the corresponding privilege exists and 0 otherwise) and performing bitwise logical operations. Thus, if the bitmap for the content privileges is C and that for the user privileges is U, then the bitwise logical AND denoted C&U is a bitmap of the privileges common to both. But if the content privileges are a subset of the user privileges, then the common privileges must be all of the content privileges, and C&U=C as bitmaps.

Conversely if S>P, then the process 37 loops over the P different possible subsets of the user privileges, generating for each its corresponding data segment identifier using the hash function, then determining whether this data segment includes any items of unstructured data. This latter task may be performed with a simple database lookup into a table of the data segment identifiers created in process 33. If S=P, then either algorithm may be used.

Regardless of the particular algorithm employed by process 37, its output is a list of data segment identifiers that contain unstructured data which the user is entitled to access. Thus, the method 30 concludes with the process 39, in which the items of unstructured data in only these data segments are transmitted back toward the client device for viewing by the user. In some embodiments, the transmitted items of unstructured data may be accompanied by structured data. A person having ordinary skill in the art will appreciate the circumstances under which the combination of structured and unstructured data in a response fulfills a request made by the user of the client device.

FIG. 4 schematically shows relevant physical components of a computer 40 that may be used to embody the concepts, structures, and techniques disclosed herein. The computer 40 may be used to implement, in whole or in part, the client device 21, the data network 23, the sever device 25, the data storage device 27, the processor 28, the CMS 29. The computer 40 also may perform, in whole or in part, the method 20 of FIG. 3. Generally, the computer 40 has many functional components that communicate data with each other using data buses. The functional components of FIG. 4 are physically arranged based on the speed at which each must operate, and the technology used to communicate data using buses at the necessary speeds to permit such operation.

Thus, the computer 40 is arranged as high-speed components and buses 411 to 416 and low-speed components and buses 421 to 429. The high-speed components and buses 411 to 416 are coupled for data communication using a high-speed bridge 41, also called a "northbridge," while the low-speed components and buses 421 to 429 are coupled using a low-speed bridge 42, also called a "southbridge."

The computer 40 includes a central processing unit ("CPU") 411 coupled to the high-speed bridge 41 via a bus 412. The CPU 411 is electronic circuitry that carries out the instructions of a computer program. As is known in the art, the CPU 411 may be implemented as a microprocessor; that is, as an integrated circuit ("IC"; also called a "chip" or "microchip"). In some embodiments, the CPU 411 may be implemented as a microcontroller for embedded applications, or according to other embodiments known in the art.

The bus 412 may be implemented using any technology known in the art for interconnection of CPUs (or more particularly, of microprocessors). For example, the bus 412 may be implemented using the HyperTransport architecture developed initially by AMD, the Intel QuickPath Interconnect ("QPI"), or a similar technology. In some embodiments, the functions of the high-speed bridge 41 may be implemented in whole or in part by the CPU 411, obviating the need for the bus 412.

The computer 40 includes one or more graphics processing units (GPUs) 413 coupled to the high-speed bridge 41 via a graphics bus 414. Each GPU 413 is designed to process commands from the CPU 411 into image data for display on a display screen (not shown). In some embodiments, the CPU 411 performs graphics processing directly, obviating the need for a separate GPU 413 and graphics bus 414. In other embodiments, a GPU 413 is physically embodied as an integrated circuit separate from the CPU 411 and may be physically detachable from the computer 40 if embodied on an expansion card, such as a video card. The GPU 413 may store image data (or other data, if the GPU 413 is used as an auxiliary computing processor) in a graphics buffer.

The graphics bus 414 may be implemented using any technology known in the art for data communication between a CPU and a GPU. For example, the graphics bus 414 may be implemented using the Peripheral Component Interconnect Express ("PCI Express" or "PCIe") standard, or a similar technology.

The computer 40 includes a primary storage 415 coupled to the high-speed bridge 41 via a memory bus 416. The primary storage 415, which may be called "main memory" or simply "memory" herein, includes computer program instructions, data, or both, for use by the CPU 411. The primary storage 415 may include random-access memory ("RAM"). RAM is "volatile" if its data are lost when power is removed, and "non-volatile" if its data are retained without applied power. Typically, volatile RAM is used when the computer 40 is "awake" and executing a program, and when the computer 40 is temporarily "asleep", while non-volatile RAM ("NVRAM") is used when the computer 40 is "hibernating"; however, embodiments may vary. Volatile RAM may be, for example, dynamic ("DRAM"), synchronous ("SDRAM"), and double-data rate ("DDR SDRAM"). Non-volatile RAM may be, for example, solid-state flash memory. RAM may be physically provided as one or more dual in-line memory modules ("DIMMs"), or other, similar technology known in the art.

The memory bus 416 may be implemented using any technology known in the art for data communication between a CPU and a primary storage. The memory bus 416 may comprise an address bus for electrically indicating a storage address, and a data bus for transmitting program instructions and data to, and receiving them from, the primary storage 415. For example, if data are stored and retrieved 64 bits (eight bytes) at a time, then the data bus has a width of 64 bits. Continuing this example, if the address bus has a width of 32 bits, then 232 memory addresses are accessible, so the computer 40 may use up to 8*232=32 gigabytes (GB) of primary storage 415. In this example, the memory bus 416 will have a total width of 64+32=46 bits. The computer 40 also may include a memory controller circuit (not shown) that converts electrical signals received from the memory bus 416 to electrical signals expected by physical pins in the primary storage 415, and vice versa.

Computer memory may be hierarchically organized based on a tradeoff between memory response time and memory size, so depictions and references herein to types of memory as being in certain physical locations are for illustration only. Thus, some embodiments (e.g. embedded systems) provide the CPU 411, the graphics processing units 413, the primary storage 415, and the high-speed bridge 41, or any combination thereof, as a single integrated circuit. In such embodiments, buses 412, 414, 416 may form part of the same integrated circuit and need not be physically separate. Other designs for the computer 40 may embody the functions of the CPU 411, graphics processing units 413, and the primary storage 415 in different configurations, obviating the need for one or more of the buses 412, 414, 416.

The depiction of the high-speed bridge 41 coupled to the CPU 411, GPU 413, and primary storage 415 is merely exemplary, as other components may be coupled for communication with the high-speed bridge 41. For example, a network interface controller ("NIC" or "network adapter") may be coupled to the high-speed bridge 41, for transmitting and receiving data using a data channel. The NIC may store data to be transmitted to, and received from, the data channel in a network data buffer.

The high-speed bridge 41 is coupled for data communication with the low-speed bridge 42 using an internal data bus 43. Control circuitry (not shown) may be required for transmitting and receiving data at different speeds. The internal data bus 43 may be implemented using the Intel Direct Media Interface ("DMI") or a similar technology.

The computer 40 includes a secondary storage 421 coupled to the low-speed bridge 42 via a storage bus 422. The secondary storage 421, which may be called "auxiliary memory", "auxiliary storage", or "external memory" herein, stores program instructions and data for access at relatively low speeds and over relatively long durations. Since such durations may include removal of power from the computer 40, the secondary storage 421 may include non-volatile memory (which may or may not be randomly accessible).

Non-volatile memory may comprise solid-state memory having no moving parts, for example a flash drive or solid-state drive. Alternately, non-volatile memory may comprise a moving disc or tape for storing data and an apparatus for reading (and possibly writing) the data. Data may be stored (and possibly rewritten) optically, for example on a compact disc ("CD"), digital video disc ("DVD"), or Blu-ray disc ("BD"), or magnetically, for example on a disc in a hard disk drive ("HDD") or a floppy disk, or on a digital audio tape ("DAT"). Non-volatile memory may be, for example, read-only ("ROM"), write-once read-many ("WORM"), programmable ("PROM"), erasable ("EPROM"), or electrically erasable ("EEPROM").

The storage bus 422 may be implemented using any technology known in the art for data communication between a CPU and a secondary storage and may include a host adaptor (not shown) for adapting electrical signals from the low-speed bridge 42 to a format expected by physical pins on the secondary storage 421, and vice versa. For example, the storage bus 422 may use a Universal Serial Bus ("USB") standard; a Serial AT Attachment ("SATA") standard; a Parallel AT Attachment ("PATA") standard such as Integrated Drive Electronics ("IDE"), Enhanced IDE ("EIDE"), ATA Packet Interface ("ATAPI"), or Ultra ATA; a Small Computer System Interface ("SCSI") standard; or a similar technology.

The computer 40 also includes one or more expansion device adapters 423 coupled to the low-speed bridge 42 via a respective one or more expansion buses 424. Each expansion device adapter 423 permits the computer 40 to communicate with expansion devices (not shown) that provide additional functionality. Such additional functionality may be provided on a separate, removable expansion card, for example an additional graphics card, network card, host adaptor, or specialized processing card.

Each expansion bus 424 may be implemented using any technology known in the art for data communication between a CPU and an expansion device adapter. For example, the expansion bus 424 may transmit and receive electrical signals using a Peripheral Component Interconnect ("PCI") standard, a data networking standard such as an Ethernet standard, or a similar technology.

The computer 40 includes a basic input/output system ("BIOS") 425 and a Super I/O circuit 426 coupled to the low-speed bridge 42 via a bus 427. The BIOS 425 is a non-volatile memory used to initialize the hardware of the computer 40 during the power-on process. The Super I/O circuit 426 is an integrated circuit that combines input and output ("I/O") interfaces for low-speed input and output devices 428, such as a serial mouse and a keyboard. In some embodiments, BIOS functionality is incorporated in the Super I/O circuit 426 directly, obviating the need for a separate BIOS 425.

The bus 427 may be implemented using any technology known in the art for data communication between a CPU, a BIOS (if present), and a Super I/O circuit. For example, the bus 427 may be implemented using a Low Pin Count ("LPC") bus, an Industry Standard Architecture ("ISA") bus, or similar technology. The Super I/O circuit 426 is coupled to the I/O devices 428 via one or more buses 429. The buses 429 may be serial buses, parallel buses, other buses known in the art, or a combination of these, depending on the type of I/O devices 428 coupled to the computer 40.

The techniques and structures described herein may be implemented in any of a variety of different forms. For example, features of embodiments may take various forms of communication devices, both wired and wireless; television sets; set top boxes; audio/video devices; laptop, palmtop, desktop, and tablet computers with or without wireless capability; personal digital assistants (PDAs); telephones; pagers; satellite communicators; cameras having communication capability; network interface cards (NICs) and other network interface structures; base stations; access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

In the foregoing detailed description, various features of embodiments are grouped together in one or more individual embodiments for the purpose of streamlining the disclosure. This method of disclosure is not to be interpreted as reflecting an intention that the claims require more features than are expressly recited therein. Rather, inventive aspects may lie in less than all features of each disclosed embodiment.

Having described implementations which serve to illustrate various concepts, structures, and techniques which are the subject of this disclosure, it will now become apparent to those of ordinary skill in the art that other implementations incorporating these concepts, structures, and techniques may be used. Accordingly, it is submitted that that scope of the patent should not be limited to the described implementations but rather should be limited only by the spirit and scope of the following claims.

What is claimed is:

1. A system for providing unstructured data to a client device, the system comprising:
  a data storage device configured to store items of unstructured data according to a set of content privileges, each item of unstructured data being further associated with a stored data segment identifier based on the set of content privileges;
a server device, coupled to the data storage device, configured to execute a service for receiving a request for items of unstructured data from a user of the client device having a set of user privileges; and
a processor, coupled to the server device and the data storage device, configured to select the stored data segment identifiers that are based on a set of content privileges that is a subset of the set of user privileges by programmatically looping over the smaller of (a) a list of the stored data segment identifiers and (b) a list of subsets of the set of user privileges;
wherein the service is configured to respond to the received request by transmitting, toward the client device, items of unstructured data that are associated with only the selected data segment identifiers.

2. The system according to claim 1, wherein the unstructured data comprise binary executable data, or video data, or audio data, or image data, or textual data, or any combination thereof.

3. The system according to claim 1, wherein at least one data segment identifier comprises a hash function of the set of content privileges.

4. The system according to claim 1, wherein the service comprises a website, or a search engine, or a content-matching application programming interface.

5. The system according to claim 1, wherein the service is further configured to respond to the received request by transmitting the items of unstructured data toward the client device together with structured data.

6. The system according to claim 1, further comprising a content management system, coupled to the data storage device, configured for altering a set of content privileges for each item of unstructured data stored in the data storage device.

7. The system according to claim 6, wherein the processor is further configured to:
detect the content management system altering the set of content privileges for an item of unstructured data stored in the data storage device;
responsively generate a universally unique data segment identifier that is associated with the altered set of content privileges for the item of unstructured data; and
store, in the data storage device, an association between the item of unstructured data and the generated universally unique data segment identifier.

8. A method of providing unstructured data to a client device, the method comprising:
storing items of unstructured data in a data storage device according to a set of content privileges;
for each item of unstructured data, computing and storing in the data storage device a data segment identifier based on the set of content privileges;
receiving a request for items of unstructured data, by a server device from a user of the client device having a set of user privileges;
selecting the stored data segment identifiers that are based on a set of content privileges that is a subset of the set of user privileges by programmatically looping over the smaller of (a) a list of the stored data segment identifiers and (b) a list of subsets of the set of user privileges; and
the server device responding to the received request by transmitting, toward the client device, items of unstructured data that are associated with only the selected data segment identifiers.

9. The method according to claim 8, wherein the unstructured data comprise binary executable data, or video data, or audio data, or image data, or textual data, or any combination thereof.

10. The method according to claim 8, wherein at least one data segment identifier comprises a hash function of the set of content privileges.

11. The method according to claim 8, wherein receiving the request from the user comprises receiving the request pertaining to a website, or a search engine, or a content-matching application programming interface, provided by the server device.

12. The method according to claim 8, wherein the responding to the received request includes transmitting the items of unstructured data toward the client device together with structured data.

13. The method according to claim 8, further comprising altering a set of content privileges for an item of unstructured data stored in the data storage device.

14. The method according to claim 13, further comprising, responsively to the altering of the set of content privileges for the item of unstructured data:
generating a universally unique data segment identifier that is associated with the altered set of content privileges for the item of unstructured data; and
storing, in the data storage device, an association between the item of unstructured data and the generated universally unique data segment identifier.

15. A computer-readable storage medium that non-transitorily stores computer program code for performing a method of providing unstructured data to a client device, the method comprising:
storing items of unstructured data in a data storage device according to a set of content privileges;
for each item of unstructured data, computing and storing in the data storage device a data segment identifier based on the set of content privileges;
receiving a request for items of unstructured data, by a server device from a user of the client device having a set of user privileges;
selecting the stored data segment identifiers that are based on a set of content privileges that is a subset of the set of user privileges by programmatically looping over the smaller of (a) a list of the stored data segment identifiers and (b) a list of subsets of the set of user privileges; and
the server device responding to the received request by transmitting, toward the client device, items of unstructured data that are associated with only the selected data segment identifiers.

16. The storage medium according to claim 15, wherein the unstructured data comprise binary executable data, or video data, or audio data, or image data, or textual data, or any combination thereof.

17. The storage medium according to claim 15, wherein at least one data segment identifier comprises a hash function of the set of content privileges.

18. The storage medium according to claim 15, wherein receiving the request from the user comprises receiving the request pertaining to a website, or a search engine, or a content-matching application programming interface, provided by the server device.

19. The storage medium according to claim 15, wherein the responding to the received request includes transmitting the items of unstructured data toward the client device together with structured data.

20. The storage medium according to claim 15, further comprising program code for, by the processor:
   detecting an altering of the set of content privileges for the item of unstructured data;
   responsively generating a universally unique data segment identifier that is associated with the altered set of content privileges for the item of unstructured data; and
   storing, in the data storage device, an association between the item of unstructured data and the generated universally unique data segment identifier.

* * * * *